(12) United States Patent
Babbi et al.

(10) Patent No.: US 7,229,006 B2
(45) Date of Patent: Jun. 12, 2007

(54) SYSTEMS AND METHODS FOR REMOTE ACCOUNT CONTROL

(75) Inventors: Rene Pierre Babbi, Vancouver, WA (US); Mark Mathias Silbernagel, Battle Ground, WA (US)

(73) Assignee: RBA International, Inc., Vancouver, WA (US)

( * ) Notice: Subject to any disclaimer, the term of this patent is extended or adjusted under 35 U.S.C. 154(b) by 0 days.

(21) Appl. No.: 11/130,131

(22) Filed: May 17, 2005

(65) Prior Publication Data

US 2005/0263588 A1 Dec. 1, 2005

Related U.S. Application Data

(60) Provisional application No. 60/572,347, filed on May 18, 2004.

(51) Int. Cl.
G06K 7/00 (2006.01)
(52) U.S. Cl. .......................... 235/375; 705/44
(58) Field of Classification Search ................ 705/1, 705/16, 18, 21, 26, 35, 39, 42, 44; 235/375, 235/379
See application file for complete search history.

(56) References Cited

U.S. PATENT DOCUMENTS 5,357,563 A * 10/1994 Hamilton et al. ........ 379/91.01
6,836,765 B1 * 12/2004 Sussman ..................... 705/75
6,853,987 B1 * 2/2005 Cook ........................ 705/75
7,031,939 B1 * 4/2006 Gallagher et al. ........... 705/39

OTHER PUBLICATIONS

International Search Report & Written Opinion, May 17, 2005.

* cited by examiner

*Primary Examiner*—Michael G. Lee
*Assistant Examiner*—Jamara A. Franklin
(74) *Attorney, Agent, or Firm*—Paul, Hastings, Janofsky & Walker LLP

(57) ABSTRACT

Systems and methods for remotely causing a request for authorization to charge a card, that is otherwise active, to be denied. In one embodiment, an access controller receives a call from a card holder and analyzes ANI and DNIS data received during call setup for the call to select a card account and an action (e.g., turn account OFF) to be taken with respect to the card account. The access controller formulates and sends a message to an account authorization processing system to cause the account authorization processing system to thereafter deny requests for authorization to charge the card account. A subsequent call to the access controller from the same caller (i.e., a same ANI) will reverse account closure and allow card authorization to proceed. Feedback, in the form of an Instant Message (IM), email, or audible signal (busy, ringing) when making the call, may be provided to indicate the success of a change to the state of the account. Embodiments that do not rely on PSTN infrastructure are also disclosed.

25 Claims, 5 Drawing Sheets

SYSTEMS AND METHODS FOR REMOTE ACCOUNT CONTROL

This application claims the benefit of U.S. Provisional Application No. 60/572,347, filed May 18, 2004, which is herein incorporated by reference in its entirety.

BACKGROUND

1. Field of the Invention

The present invention relates generally to systems and methods for countering fraudulent use of credit cards and the like. More specifically, the present invention relates to systems and methods for providing account holders real-time remote control over the availability of a given account using advanced telephony techniques.

2. Background of the Invention

There are many challenges in managing personal finances in today's world, including fraud, accidental transactions, avoidable fees, and other issues. There is thus a growing need to provide consumer driven tools that preferably provide the consumer with a high level of control over his/her financial accounts.

Card theft and fraud are, unfortunately, extremely pervasive. It is has been said that the cost of card fraud—to card holders and to card companies alike—may be as high as $500 million per year. Everyone pays for card fraud in higher prices, whether or not they are personally defrauded. Of course, when one does personally fall victim to this type of fraud, it can be devastating both financially and personally.

When a purse or wallet including cards is stolen, it may be only a matter of hours, or even minutes, before those cards are used to purchase hundreds, if not thousands of dollars worth of merchandise. While theft is probably the most obvious precursor to card fraud, it is not the only way fraud occurs. A more subtle form of fraud is "misappropriation," which is the use of a card number (and not necessarily the card itself) without the owner's permission. Unfortunately, obtaining someone else's card information is not particularly difficult. For example, telephone scams abound in which a caller might indicate that one need only provide a card number and associated expiration date to qualify for a "special discount vacation." Alternatively, thieves might simply sift through a homeowner's trash to find discarded receipts or carbons with credit numbers and expiration dates. Further, and perhaps less common, though not less damaging, is a scenario in which a dishonest sales clerk who, in the course of a legitimate transaction, makes an extra imprint of a card for subsequent fraudulent use.

In today's fast paced economy it is difficult to always carefully scrutinize every card transaction, especially when people are increasingly using cards for purchases worth only a few dollars. While companies have recently instituted better safeguards, including real-time, dial up, authorization, such safeguards do not necessarily protect against all possible fraudulent uses of someone's card. Indeed, in the case where a card is stolen, a subsequent transaction would still be "authorized" unless the owner of the card was able to first notify the issuer/company of the theft, so that the account could be closed.

There is therefore a critical need for improved safety and anti-fraud measures with respect to cards and the like. There is also a need to provide to the owner of the account improved overall control over the account.

BRIEF SUMMARY OF THE INVENTION

Embodiments of the present invention are designed, in at least one, focused, aspect, to reduce the likelihood of fraudulent or unauthorized use of a card or account by giving the account holder acute control over the account, through a novel use of telephony, to enable or disable normal authorization processing of transactions and, thereby, effectively turn the card OFF (and/or ON). In a broader aspect, embodiments of the present invention are designed to provide an account holder acute control over his/her account, through the use of one several possible consumer driven methods, to enable or disable one or more predetermined rules that control normal authorization processing of transactions. Such rules may be limited to enabling or disabling a particular account, but may also include more complicated rules, which can be toggled ON or OFF, to discern which of several individual transactions might be eligible for approval.

With a conventional card, once the card is issued to an account holder and is initially activated (sometimes via well-known Interactive Voice Response (IVR) systems), the card is thereafter always activated or ON. In accordance with embodiments of the present invention, on the other hand, the conventional paradigm of "always on," is shifted to an alternative paradigm in which a card or account can be reversibly switched OFF, and then back ON, by the account holder or consumer, at will, through telephony techniques or techniques that do not necessarily rely on the facilities inherent in the public switched telephone network. By turning a card ON, only when a consumer is likely to use the card, fraudulent/unauthorized use of the consumer's card can be effectively eliminated. Also in accordance with the present invention, an account holder preferably has the option of toggling ON or OFF one or several rules, one of which could be the complete disablement of a card.

Embodiments of the present invention are focused on simplicity for the consumer and thus preferably avoid standard telephony offerings, such as Interactive Voice Response (IVR) and others, which require leading a caller through a maze of confusing and frustrating voice prompts.

Nomenclature

In the instant description, the term "card" is used as an abbreviation and a generalization. As such, the term "card" should be broadly interpreted to comprise credit cards, debit cards, prepaid cards, closed loop cards, open loop cards, and private cards. The term "card" should also be interpreted to include "virtual cards" or "accounts" since the term "card" is often just a convenient way to refer to an account. An "account holder" is a person who has control over a given account, which is typically accessed using a "card" as defined above.

The term "call setup information" comprises data elements typically passed within the Public Switched Telephone Network (PSTN) during that portion of the call immediately prior to the call being answered. This segment of a call is sometimes referred to herein as "call setup."

The term "advanced telephony" is used in this description to refer, at least, to the use of a sequence of key presses (touch tone, or phone pad), which reduce the number of keys that must be pressed to accomplish an intended function. This functionality is similar to the concept of what people sometimes refer to as "speed dial." In embodiments of the present invention, a user may make use of advanced telephony, by prior arrangement with a carrier, to abbreviate a given necessary sequence of button presses to increase ease-of-use and simplicity for the consumer.

The term "transaction" refers to any activity between the outside world and an account. This may include purchases, payments, request for authorizations, and any other transactions that are sent for processing on a given card. This term may also refer to component parts of a transaction, e.g., a POS (point of sale) purchase that has a request for cash back. The cash back portion of this transaction may be considered as a separate transaction.

Centrality

A component of some embodiments of the present invention is a "switch"—that means of "turning off" (or controlling in a predetermined way) authorization processing of transactions. In preferred implementations, this "switch" may be implemented in one of two places.

In some applications, the 'best' instance in terms of utility and effectiveness, is to place the "switch" in the most central place, i.e., within the existing credit/debit/prepaid card infrastructure, such as those operated by, e.g., Visa™, Mastercard™, American Express™, and merchants such as Sears™, etc. One advantage of such placement is that there are some functions performed by these regional, national, and global processors that are performed, as contractually defined and under certain circumstances, in proxy for the "issuing financial institution." This proxy activity is often called "stand-in" processing. Thus, centrally placed, the switch can appropriately affect these "stand in" activities which would otherwise never reach the "issuer". In other words, the control over a given account in accordance with the present invention is implemented by stand-in processor.

In alternative embodiments, the switch or controller may be placed at the issuing financial institution. While such an implementation would operate effectively, it would do so only with respect to a given institution's cards.

In exemplary embodiments, the portion of the system of the present invention that interacts with the consumer or account holder to control the card could, likewise, either be located centrally, or located at the issuer. In the latter case, the issuer might then have to transmit a message to the network. Such a message could easily be incorporated into the existing and the well-known ISO 8583 message set. For example, a message type "302" could be used to communicate to a central processing facility the account number and 'new' state of that account.

These embodiments may provide solutions that are global in effect. In other alternative embodiments, the 'switch' may be placed in a merchant processing network, thereby extending coverage to those card transactions handled by that particular merchant processing network.

At a high level the present invention provides methods and systems for remotely causing a request for authorization to charge a card, that is otherwise active, to be matched up against one or more rules that may cause the transaction to be denied.

In a preferred telephony embodiment, this is accomplished by providing an access controller at which is received a telephone call from an account holder. ANI and DNIS data is received during a call setup period for the call and is analyzed to select a card account based on the ANI, and decide how to control the account (e.g., enable/disable) based on DNIS. In the case where the action is to turn OFF the card, the access controller formulates and sends a message to an account authorization processing system to deny subsequent requests for authorization to charge the card account. In a preferred implementation, some form of feedback is provided to the card holder that the account was successfully turned OFF (or turned back ON, as the case may be).

Notwithstanding the foregoing, embodiments of the present invention can be implemented in ways other than through the PSTN. For example, an account holder, in accordance with the present invention, is also preferably able to control a card by toggling ON or OFF one or more rules through the use of a web page or a PDA, using the Internet. Of course, the rules may also be toggled by leveraging the infrastructure of the PSTN mentioned above.

Rules that can be toggled in accordance with the present invention include, singularly, or in various combinations, one or more of the following:

Turn account on/off completely.

Temporal Rules; e.g., based on times in any time zone, or on times dictated by other factors such as sunrise, sunset, holidays, work hours, work week, etc. Control may be imposed by, e.g., enabling/disabling for a predetermined time span, or upon reaching a predetermined time.

Merchant Code Rules

Currency Amount

Velocity Rules; e.g., the number of transactions over time, a total amount over time. Such a rule is readily combinable with other rules such as total amount for a merchant code over time, or total amount for a given transaction type over time.

Transaction Type; e.g., International, POS (Point Of Sale), Card Not Present, ATM, Cash Back Level III Data Location Rules Proximity Rules; i.e., the distance between account activity and the account holder at that time. Such a distance may be determined using cell phone based geographical location, GPS, or other location gathering means.

Biometric Info Rules; rules based on biometric data gathered at the time of activity or gathered at a previous time.

The foregoing and other features of the present invention will be more fully appreciated upon a reading of the following detailed description along with the accompanying drawings.

DETAILED DESCRIPTION OF THE INVENTION

The present invention enables account holders, such as card holders, to play a larger role in overall account control by giving the owner of the account specific, remote, and at-will control over access to the account associated with the card. The control is implemented, in one embodiment, by using the public switched telephone network (PSTN) to communicate with a central access location, which is configured to communicate with a system that receives and issues card transaction authorization to effectively toggle predetermined rules regarding transaction processing for the card OFF (or back ON).

Figure 1:
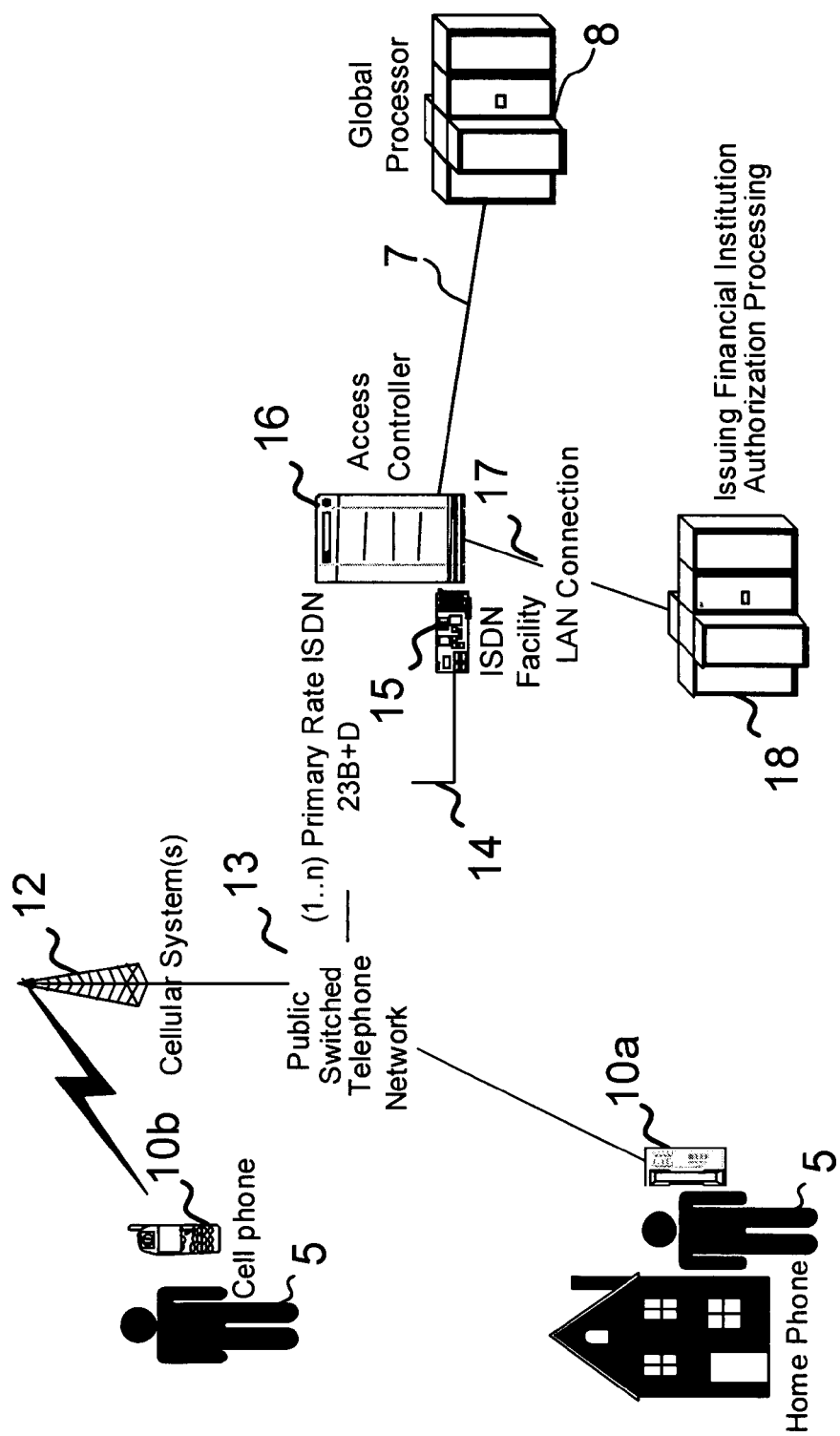
FIG. 1 depicts exemplary components within and over which an embodiment of the present invention operates.

Reference is first made to FIG. 1, which shows typical components within and over which a telephony embodiment of the present invention operates. The present invention will work equally as well with a conventional land line 10a or cellular connection 10b. A basic concept underlying this embodiment of the present invention is that an account card holder initiates a telephone call to a predetermined telephone number. Dialing of the number can be by regular touch tones, speed dial, or other advanced telephony functionality that may be available. Once the number is dialed (by the desired means) the public switched telephone network (PSTN) 13 will process the call and attempt, in the first instance, to set it up, prior to a connection actually being established (e.g., using well-known SS7 messaging). In the case of landline 10a, PSTN 13 immediately takes over this messaging function, whereas in the case of cellular connection 10b, a wireless telecommunications service provider typically is interposed between the caller 5 and PSTN 13.

During a typical call set up sequence, PSTN 13 passes call set up information via, e.g., ISDN service 14, to ISDN facility 15, which is closely integrated with an access controller 16, which, as will be explained below, is responsible for communicating with an Issuing Financial Institution or other "authorization processing entity" 18 that controls card/account transaction/authorization processing.

Figure 2:
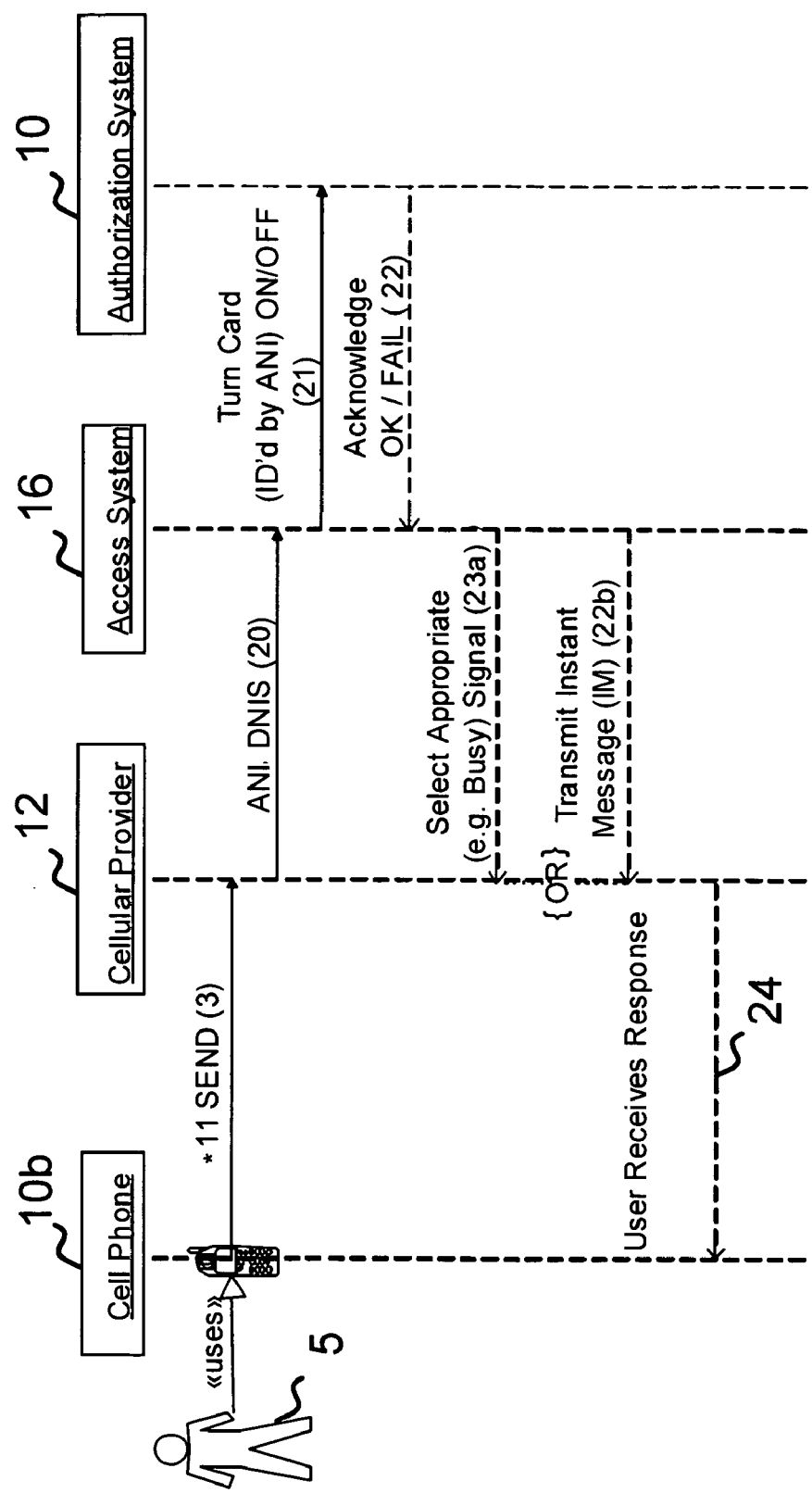
FIG. 2 illustrates a unified modeling language (UML) sequence diagram showing the flow and sequence of messages in a typical use scenario in accordance with the present invention.

Even more specifically, as shown in FIG. 1, and with further reference to FIG. 2 (and in the case of a cell phone 10b), an account holder 5 uses cell phone 10b to send a uniquely-crafted message 3 to the cellular provider/partner 12, which partner 12 initiates a call to access controller 16. At the outset of this call, a setup message 20 is transmitted to ISDN facility 15, which captures the caller's cell phone number using Automatic Number Identification (ANI). This captured ANI is then used by access controller 16 as a "key" to an account number or a means to look up an actual account number in a table previously constructed for that purpose. ISDN facility 15 also captures the caller's dialed number via the Dialed Number Identification Service (DNIS), and access controller 16 interprets the same as an indication that the consumer wishes one or several rules to be one of enabled or disabled (ON or OFF). Access controller 16 then formulates and forwards a message 21, preferably using standard communications methods and protocols (such as HTTPS—secure/encrypted http) and using standard messaging techniques (e.g., XML/SOAP), to authorization processing entity 18. Authorization processing entity 18 could be the card issuing financial institution, a stand-in, global, processor 8 (FIG. 1), or a merchant's own network. Whatever the case, authorization processing system 18 then causes the selected rules identified in message 21 to be disabled (or enabled). Although shown separately, ISDN facility 15 and access controller 16 could be a single integrated device. As shown in FIG. 1, global processor 8 is preferably in communication with access controller 16 via connection 7, a network connection similar to that between access controller 16 and authorization processing entity 18.

In a preferred implementation, authorization processing system 18 (or global processor 8) responds back to access controller 16 with an acknowledge message 22, which indicates the outcome (OK or fail) of the processing of message 21. In turn, access controller 16 then preferably initiates either an 'in-channel' response 23a to the caller 5 in the form of, e.g., busy signal 23a, or alternatively, or an out-of-band response 23b using, e.g., an Instant Messaging (or a short message service (SMS) message), which indicates the success (and perhaps resulting state of the account due to) the initial call 3. Response 23a, 23b is ultimately delivered as shown by reference numeral 24 to caller 5/cell phone 10b.

Figure 3:
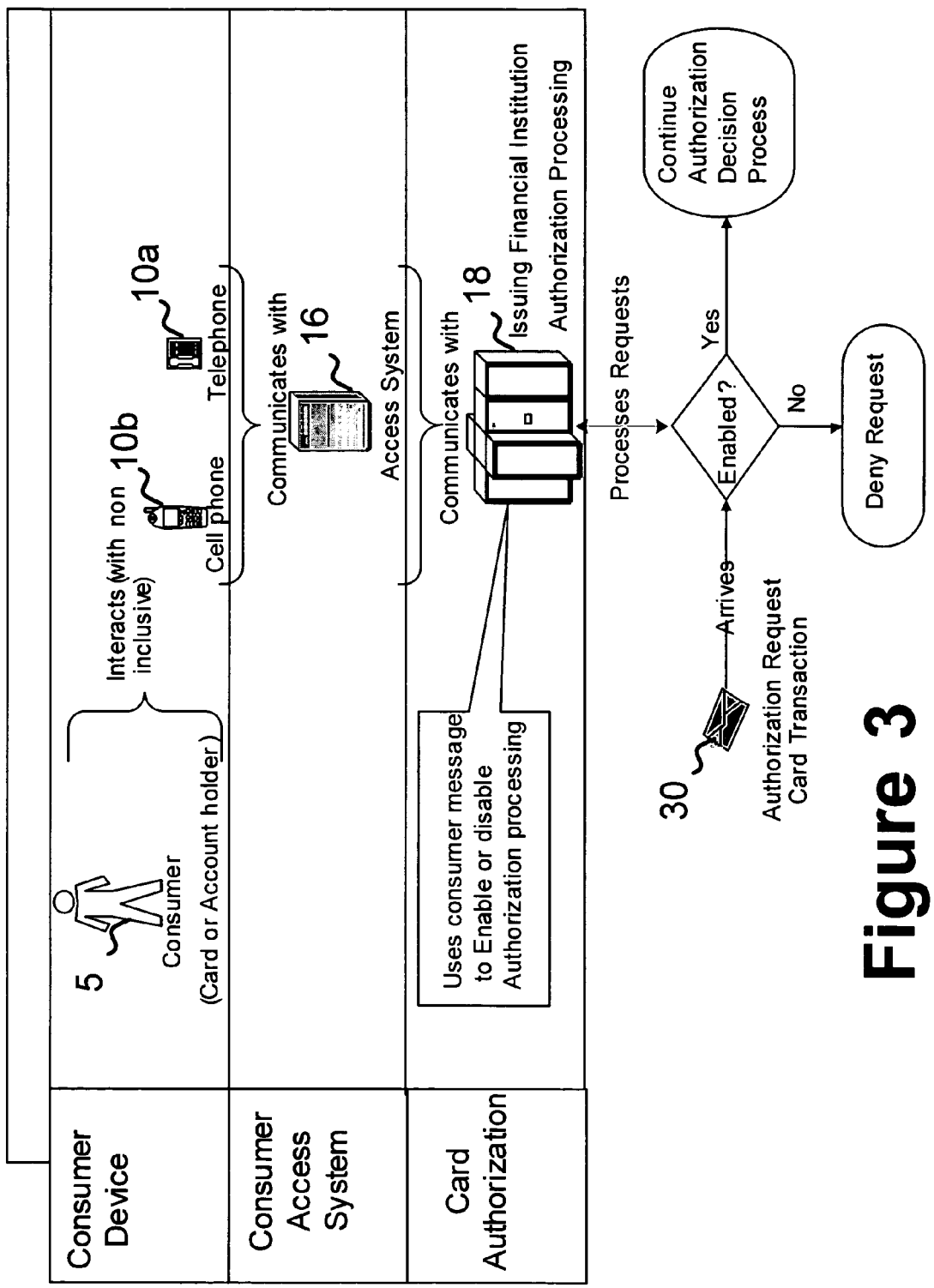
FIG. 3 shows a consumer access topology in accordance with the present invention in which an authorization request is received.

FIG. 3 illustrates principles of the present invention using a "Consumer Access Topology," or layered structure, that depicts the logical arrangement of the various systems involved in transaction authentication and how they might interact to instantiate account transactions. As shown, a consumer or caller 5 uses a regular landline telephone 10a or cell phone 10b (or generically a "consumer device," which might also include a computer connected to a network by wire or wireless connection, or a PDA with wireless connectivity) to send a succinct message (without, preferably, having to rely on IVR type interactivity) to access controller 16. Keying off of captured ANI and DNIS from the call (or IP address, email address, and/or unique code, in the case of the computer or PDA), access system sends a message in a predetermined format to authorization processing system 18, which then enables or disables an account corresponding to the ANI. When an authorization request 30 is subsequently received by authorization processing system 18, it is determined whether the authorization being sought is permissible in view of the rules then enabled or disabled. If the rules allow, authorization proceeds as is conventional. If a toggled-ON rule(s) causes the authorization to denied, then the request for authorization 30 is denied. Thus, the present invention provides the ability for a card holder to deny transaction authorization to a card, even when the account associated with the card is otherwise active.

As will be appreciated by those skilled in the art, a significant advantage of the present invention is simplicity for the consumer. This is accomplished, in the instant telephony embodiment, by employing tightly coupled integration between telephony (call setup information, dial techniques) and the financial instrument (account number, authentication). In traditional IVR systems, telephones are employed by first calling a number, whereupon a telephony system answers the call. The consumer might then have to listen to voice prompts and respond through the use of the phone's keypad (e.g. "Press 1 for On, Press 2 for Off"). Embodiments of the present invention, however, avoid the complexity and confusion associated with these traditional systems by implementing a system that receives non-verbal commands from the user.

For instance, as mentioned, the call initiated by the card holder may involve the use of 'speed dial' or an abbreviated sequence of keystrokes. In the cellular telephone case, 'custom' sequences (or so-called short codes) might be used. Examples might include *11 for ON and *22 for OFF, or 111 for ON and 222 for OFF. No further action on the part of the caller/card holder would be necessary to, e.g., enable or disable the account. Other, mnemonic, combinations may, of course, also be implemented. Obviously, use of custom sequences may require cooperation from the cellular system provider. When such cooperation is not forthcoming or unavailable, speed-dial may be used. Generally speaking, custom sequences have the benefit of simplicity for non-sophisticated users, and speed for all users.

In alternative embodiments, a custom sequence, e.g., *11, may be used as a prefix to a longer overall number, which, for instance, could include the last four digits of a card/account number to indicate which rule associated with one of possibly multiple cards associated with the caller's phone number is being turned ON or OFF. For example, *110033 would toggle ON rules associated with the account number ending with the digits 0033 and belonging to the caller (based on the received ANI).

Figure 4:
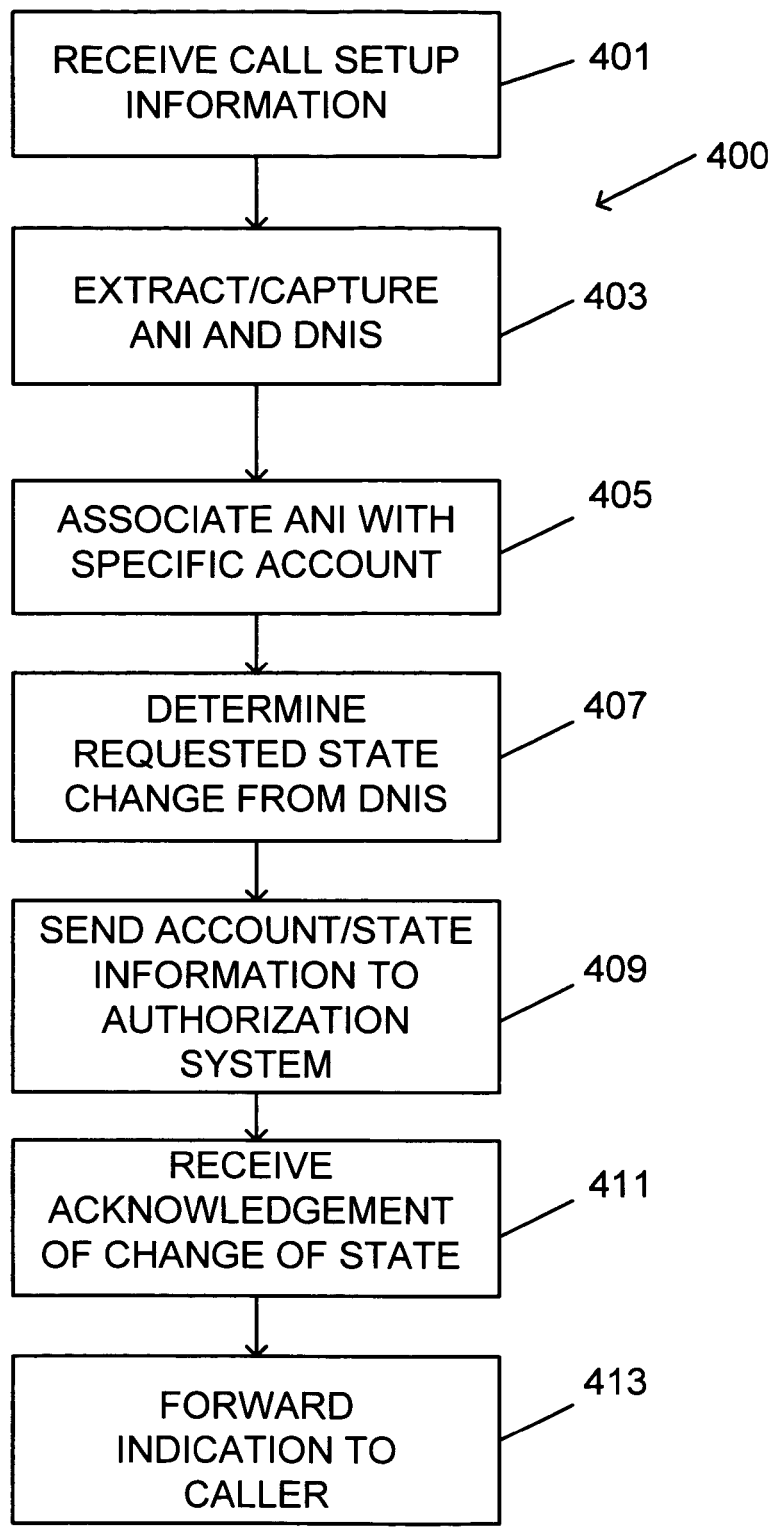
FIG. 4 depicts a flow chart that illustrates an exemplary series of steps in accordance with the present invention.

FIG. 4 depicts a flow chart that illustrates an exemplary series of steps 400 for carrying out the telephony implementation of the present invention. At step 401 call setup information is received, in response to a call made by regular landline or via a cellular telephone. The number dialed preferably determines the caller's intent to, e.g., turn the card ON or OFF (assuming that was the only rule available to activate). Of course, a single number may be implemented, which, when called, causes the account simply to be toggled to the other of OFF or ON, depending on its then-current state.

At step 403, both the ANI and DNIS are extracted from the call setup information.

At step 405, the ANI is used to determine, possibly without any further information from the caller, which account(s) is/are being affected. In a preferred implementation, a table is implemented that matches ANIs with respective card accounts. In another possible implementation, a single ANI is used to affect multiple accounts simultaneously. It is noteworthy that ANI is distinct from CALLER-ID, in that it is possible to exploit various means to manipulate or block the Caller ID, whereas ANI is a carrier managed component and, as such, is not easily susceptible to outside manipulation.

At step 407, the DNIS is used to determine a requested state of change in the account. This is especially important in the case where the dialed number impliedly includes specific information (i.e., to turn OFF or to turn ON, or to designate a specific account), rather than being interpreted as a simple toggle request. Both ANI and DNIS are preferably captured using ISDN facilities in coordination with the PSTN. That is, there is relatively tight integration between the PSTN and a terminating end of the caller's call (i.e., ISDN facility 15 and/or access controller 16).

At step 409, based on the ANI and DNIS, as well as any further prearranged direction (e.g., matching multiple cards to a single ANI), a message is sent to an authorization processing system that includes the affected accounts and the states to which they should be set (namely, ON or OFF).

Preferably, at step 411, an acknowledgment message is received confirming the state changes requested and, at step 413, an indication that the account(s) have been so set is preferably returned to the caller from whom the call was received in the first place at step 401.

By leveraging existing functionality of the PSTN and being closely integrated therewith, the present invention allows a consumer's orders to be easily and swiftly effected, possibly even before the consumer hears a first ring on his telephone.

Though it would be possible to practice the invention without feedback to the card/account holder, such feedback is preferably provided. For example, using ISDN services a signal, or auditory cue, can be issued to indicate the call has accomplished a state change for the card. A busy signal might be "delivered" when a state change has occurred, while a continued ringing or other (reorder) signal might indicate that the task was not successfully completed. The use of busy or reorder signaling could be chosen to communicate status and reduce the possibility of confusion, as much as possible and allowable.

Alternatively, to even more clearly communicate the results of the 'call' to change state, informing the consumer and confirming the card's new state might be accomplished using an "instant message" (IM), which might be sent indicating not only the card's (now) current state, but also possibly the card's balance, or most recent (e.g., 4–5) transactions. This additional information is, of course optional.

In still another alternative, the call could be answered and a short message 'played' to indicate the card's new state.

In yet another alternative, feedback to the consumer might be in the form of an e-mail that is sent to a wireless PDA or wired computer indicating the card's (now) current state and, optionally as above, the card's balance, or most recent (e.g., 4–5) transactions.

Figure 5:
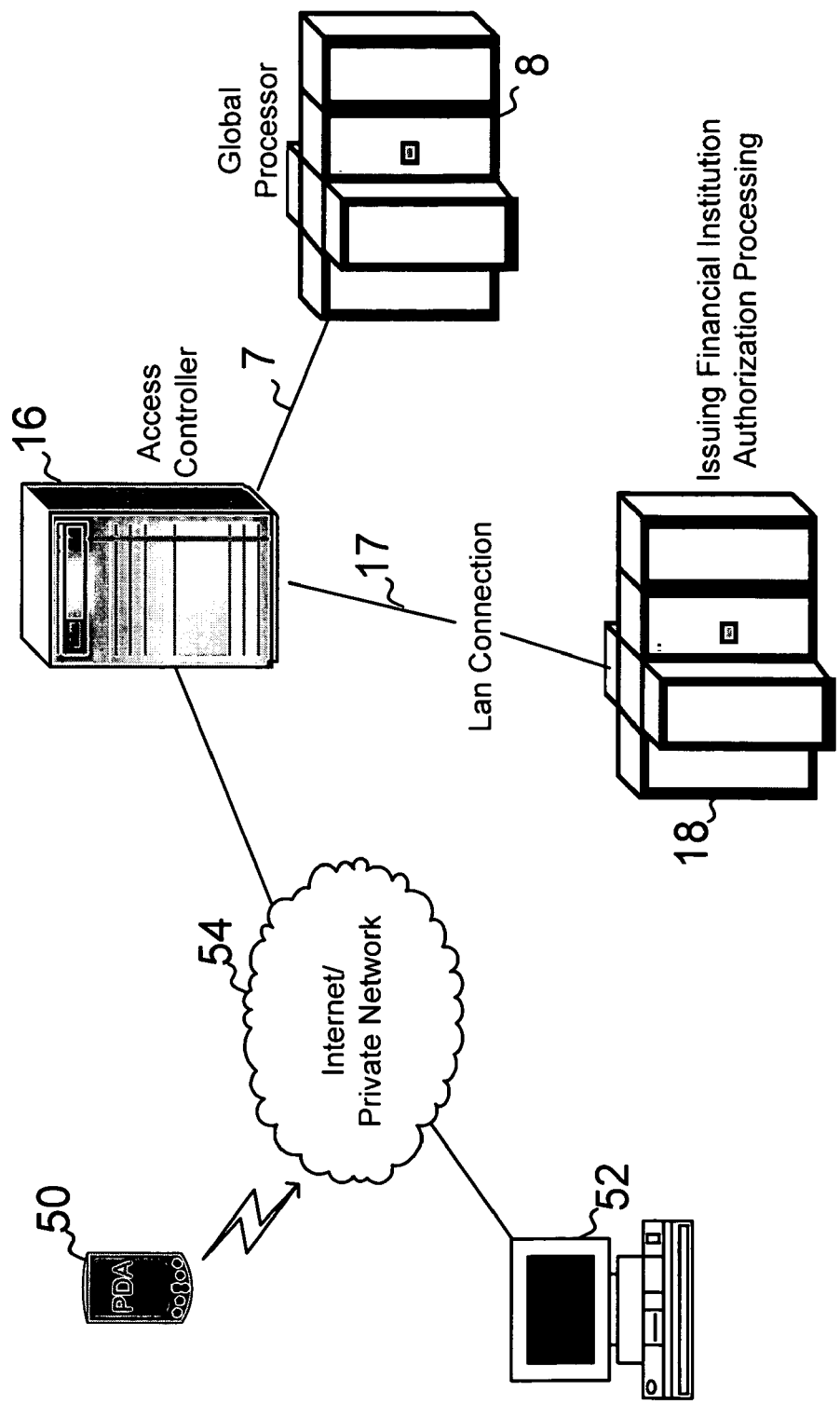
FIG. 5 depicts an exemplary non-telephony embodiment of the present invention.

As mentioned above, the present invention is not limited to implementation using the PSTN infrastructure. Instead, as shown in FIG. 5, a PDA 50 or computer 52, may connected to a network 54, which may include the Internet or a private network (or a combination thereof). Network 54 is, in turn, also connected to access controller 16. In this "non-telephony" embodiment, instead of capturing ANI and DNIS information from the PSTN to determine an account and the account holder's intended order, access controller 16 captures, e.g., an IP address, email address, and/or specific instructions in an email or instant massage (IM) for toggling or controlling one or more of several rules that might be applied in determining whether a request for authorization for the card should be granted. The method employed by the account holder is not limited to the above mentioned technologies, but could include any method available to communicate the intention of the account holder to toggle a given rule. This could include interaction with a human or IVR.

Rules that can be toggled ON or OFF in accordance with the present invention include, singularly, or in various combinations, one or more of the following:

Turn account on/off completely.
Temporal Rules; e.g., based on times in any time zone, or on times dictated by other factors such as sunrise, sunset, holidays, work hours, work week, etc. Control may be imposed by, e.g., enabling/disabling for a predetermined time span, or upon reaching a predetermined time.
Merchant Code Rules; e.g., which merchants are authorized.
Currency Amount.
Velocity Rules; e.g., the number of transactions over time, or a total amount over time. Such a rule is readily combinable with other rules such as total amount for a merchant code over time, or total amount for a given transaction type over time.
Transaction Type; e.g., International, POS (Point Of Sale), Card Not Present, ATM, Cash Back.
Level III Data.
Location Rules; e.g., only in particular cities/states/countries, or never in particular cities/states/countries.
Proximity Rules; i.e., the distance between account activity and the account holder at that time. Such a distance may be determined using cell phone based geographical location, GPS, or other location gathering means.
Biometric Info Rules; rules based on biometric data gathered at the time of activity or gathered at a previous time.

These rules may modify each other in ways that are not about the actual authorization of a transaction. A temporal rule may be used to set a time limit or time window on another rule. A rule to disallow all "card not present" transaction may be set to operate during certain hours of the day, or to expire after a given amount of time. These "rules controlling rules" can be combined so that a rule or group of rules controlling authorization processing can be set to a specific time span, to apply to only one transaction type, and for the whole thing to expire at a particular date. This is just one example of the possible combinations that can be constructed. Another type of rule intended to augment others would be a consumer controlled trigger rule. This rule would stipulate some activity that would automatically cause another rule, or group of rules to be enabled. This could include rules that augmented the transaction authorization processing rules as well. An example could include a trigger rule that stipulated that the next time that card was used that the merchant type or specific merchant at which the card was being used would be the only place that the card would be enabled.

One way to appreciate the adding, layering, and combining of account transaction authorization rules is to equate them with firewall rules. A firewall is a border device used to route and manage digital network traffic between technology systems. These devices use various languages that help define a set of rules that are applied to individual pieces of network traffic to determine what to do with them, including rejecting them completely. A similar approach can be applied to implement a rules-based transactions processing system in accordance with the present invention. Specifically, a single transaction, or possibly parts of a transaction, are evaluated and rejected based on all rules that are enabled and that are applicable to that transaction. Some examples of firewall-like features that may be used include: so-called "white lists" and "black lists," the ability to combine rules, the ability to set an order of precedence, and the ability to switch a default of an account to deny everything and then provide exceptions.

As noted, in some implementations, the account holder is preferably able to combine rules into groups that act as one rule. These groups then can then be enabled and disabled as if they were an individual rule. Every rule, whether it is a single rule or a group of rules, preferably evaluates down to an action to take for a given transaction.

In view of the foregoing, the present invention provides numerous advantages for consumers. The disclosed techniques to implement remote control to toggle ON or OFF one or several rules for controlling transactions in an account, in accordance with the present invention, is easy to use, relatively simple in concept from a user's perspective, fast when applied, reversible by the consumer with a similar effort, and inexpensive since existing PSTN and other available functionality is used.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of remotely controlling authorization processing for an account, comprising the steps of:
    receiving call setup information, including Automatic Number Identification (ANI) and Dialed Number Identification Service (DNIS), related to a call directed to an access controller;
    extracting the ANI and DNIS from the setup information;
    associating at least one account with the ANI and determining a requested action based on the DNIS;
    forming and sending a message to an account authorization processing system, the message including identification of the at least one account and the requested action, the message causing one or more rules effecting authorization of transactions to be toggled ON or OFF.

2. The method of claim 1, further comprising forming and sending the message only when at least one rule that is caused to be enabled by the requested action is effective to disable subsequent transaction processing for the at least one account.

3. The method of claim 2, further comprising sending an indication to a holder of the account indicating that the at least one account is disabled.

4. The method of claim 3, wherein the indication is an instant Message (IM).

5. The method of claim 3, wherein the indication is an email.

6. The method of claim 3, wherein the indication is one of a busy signal and a ringing signal.

7. The method of claim 1, wherein a subsequent message causes the account to be enabled.

8. The method of claim 1, wherein the DNIS includes at least a portion of a number of the account.

9. The method of claim 1, further comprising denying a request for authorization received at the authorization processing system after the message is received at the authorization processing system.

10. The method of claim 1, wherein the ANI and DNIS are captured using ISDN services.

11. The method of claim 1, wherein the call is received from a cellular telephone.

12. The method of claim 1, wherein the call is received from a landline telephone.

13. The method of claim 1, wherein the account is disabled only in response to a caller's call, without further action by a caller who placed the call.

14. The method of claim 1, wherein the account is at least one of for a credit card, debit card, store branded card, security or access card, smart card,. stored value card and a prepaid card.

15. The method of claim 1, wherein at least one of the call and a custom sequence of numbers is initiated by speed-dialing.

16. The method of claim 1, wherein the access controller is operated by a stand-in processing entity.

17. The method of claim 1, wherein the access controller is operated by an issuing financial institution of a card associated with the account.

18. The method of claim 1, wherein the access controller and account authorization processing system communicate with each other via a communications network.

19. A method of remotely causing a request for authorization to charge an account, that is otherwise active, to be denied, comprising the steps of:
    providing an access controller;

receiving at the access controller a call from an account holder;

analyzing Automatic Number Identification (ANI) and Dialed Number Identification Service (DNIS) data received during call setup for the call, and selecting an account controlled by the account holder and an action to be taken with respect to the account controlled by the account holder in view of the ANI and DNIS data; and formulating and sending a message to an account authorization processing system to deny requests for authorization to charge the card account.

20. The method of claim 19, further comprising:

receiving at the access controller a second call from the account holder;

analyzing ANI and DNIS data received during call setup for the second call and selecting the account, controlled by the account holder and another action to be taken with respect to the account controlled by the account holder in view of the ANI and DNIS data of the second call; and formulating and sending a second message to the account authorization processing system to allow requests for authorization to charge the account controlled by the account holder.

21. The method of claim 19, further comprising sending an indication to the account holder indicating a state of the account controlled by the account holder.

22. The method of claim 21, wherein the indication is in the form of at least one of an Instant Message, an email, and an auditory cue during the call.

23. The method of claim 22, further comprising sending additional information about the account controlled by the account holder.

24. The method of claim 19, further comprising partnering with a cellular telephone service provider that supports shortened dialing functionality to reach the access controller.

25. The method of claim of claim 19, wherein the account controlled by the account holder is at least one of credit card, debit card, store branded card, security or access card, smart card, stored value card and a prepaid card.

* * * * *

UNITED STATES PATENT AND TRADEMARK OFFICE
CERTIFICATE OF CORRECTION

| | |
|---|---|
| PATENT NO. | : 7,229,006 B2 |
| APPLICATION NO. | : 11/130131 |
| DATED | : June 12, 2007 |
| INVENTOR(S) | : Rene Babi and Mark Silbernagel |

It is certified that error appears in the above-identified patent and that said Letters Patent is hereby corrected as shown below:

On the face of the patent at (12) and (75), replace the inventor name "Babbi" with -- Babi --.

Signed and Sealed this

Twenty-eighth Day of August, 2007

JON W. DUDAS
*Director of the United States Patent and Trademark Office*